United States Patent [19]

Park et al.

[11] Patent Number: 5,695,656
[45] Date of Patent: Dec. 9, 1997

[54] METHOD FOR FABRICATING A MAGNETIC THIN-FILM HEAD

[75] Inventors: Deok-yeong Park; Kuk-hyun Sunwoo, both of Suwon, Rep. of Korea

[73] Assignee: Samsung Electro-Mechanics Co., Ltd., Suwon, Rep. of Korea

[21] Appl. No.: 572,716

[22] Filed: Dec. 14, 1995

[30] Foreign Application Priority Data

May 29, 1995 [KR] Rep. of Korea ............ 95-13698

[51] Int. Cl.⁶ .................................................. B44C 1/22
[52] U.S. Cl. ............................ 216/22; 216/51; 216/66; 216/75
[58] Field of Search .......................... 216/22, 41, 51, 216/66, 75; 29/603; 360/126

[56] References Cited

U.S. PATENT DOCUMENTS

| | | | |
|---|---|---|---|
| 4,912,584 | 3/1990 | Mallary et al. | 216/22 X |
| 5,200,056 | 4/1993 | Cohen et al. | 216/22 X |
| 5,462,637 | 10/1995 | Thiele | 216/22 |

*Primary Examiner*—William Powell
*Attorney, Agent, or Firm*—Foley & Lardner

[57] ABSTRACT

A magnetic thin-film head fabrication method which improves the yield of the thin-film head by reducing the deviation of line widths for various regions of a pole layer includes the steps of forming an upper pole layer on a to-be-etched magnet-forming layer formed on a lower pole layer, forming a metallic seed layer on the upper pole layer, forming an insulating layer having an aperture corresponding to a desired pattern on the seed layer, forming a metal mask layer on the exposed plane of the seed layer by a plating method, removing the insulating layer and etching the exposed portion of the magnet-forming layer which is not covered by the metal mask layer to a predetermined depth. Since the pattern of the metal mask layer can be changed easily and precisely by the shape of the photoresist layer, the size deviation of the processed products due to processing error for each product is reduced, thereby maximizing the reproducibility of the upper pole layer. Consequently, the deterioration rate of the completed magnetic thin-film head is minimized, and the performance difference between the products is reduced.

12 Claims, 5 Drawing Sheets

METHOD FOR FABRICATING A MAGNETIC THIN-FILM HEAD

BACKGROUND OF THE INVENTION

1. Field of the Invention

The present invention relates to a method of fabricating a magnetic thin-film head and, more particularly, is directed to a method of making a magnetic thin-film head, wherein the yield of the magnetic thin-film head is increased by reducing the deviation of width of a pole layer in the magnetic thin-film head.

2. Description of Background Art

Methods of forming a pole layer for a magnetic thin-film head for recording and reproducing magnetic information are largely classified into a wet etching method and a dry etching method. The wet etching method is widely used as a method for forming an upper pole layer of NiFe alloy plating.

Recently, in response to the rising need for high-density storage, the conventional NiFe alloy upper pole layer material has been replaced by FeN-series materials. With this adoption and use of FeN-series materials, it has become difficult to continue using the conventional wet etching method that was used in connection with conventional NiFe alloy materials. Accordingly, a selective etching method (a dry etching method) using a mask has been adopted. In the conventional dry etching method, the mask for etching the upper pole layer is a photoresist obtained by a photolithographic method or a metal mask obtained by etching a metal layer using the photoresist as a mask.

FIGS. 1A & 1B through 4A & 4B illustrate the sequence of steps for fabricating the upper pole layer by the dry etching method using a photoresist as a mask, in which the "A" drawings are side sectional views of the end region of the pole layers, and the "B" drawings are front sectional views of the same.

FIGS. 1A and 1B each show a metal layer 5 as an upper pole layer formed over the entire surface of a planarization layer that protects a magnetic coil 4 to which a recording current is applied. Reference numeral 1 is a lower pole layer, reference numeral 2 is an insulating layer made of $SiO_2$ or $Al_2O_3$ for providing a magnetic recording gap, and reference numeral 3 is a planarization layer provided above and below the magnetic coil.

As shown in FIGS. 2A and 2B, a photoresist pattern 6 of a predetermined height is formed on metal layer 5 as a mask for fabricating upper pole layer. Here, the pattern is formed by a general photolithographic method which includes material coating, exposing and developing stages.

As shown in FIGS. 3A and 3B, in order to form an upper pole layer from metal layer 5, the portion that is not covered by the photoresist pattern 6 is etched down to the insulating layer 2 by reactive ion etching (RIE).

As shown in FIGS. 4A and 4B, the desired magnetic head is obtained by removing the photoresist pattern 6.

The above-described dry etching method using photoresist as a mask for forming an upper pole layer has certain disadvantages. As shown in FIG. 5A, since the photoresist has a considerable thickness, a shadow effect occurs, and the cross-section of the photoresist becomes trapezoidal such that the width of the lower portion thereof is larger than that of its upper portion. Moreover, when a thick layer of photoresist is used, an unetched portion 5a remains in the lower portion of upper pole layer 5, again due to the shadow effect. If a thin photoresist layer 6' is used in an attempt to try to rectify this problem, the unetched portion 5a' remaining in the lower portion of upper pole layer 5 is reduced, as shown in FIG. 5B. However, as the thin photoresist layer 6' is etched, both edges 5b of upper pole layer 5 become eroded.

In order to solve this problem, the ion beam should travel as vertically or perpendicular as possible with respect to an etching plane. However, when the ion beam travels vertically with respect to the etching plane, the etching rate is reduced and the etched photoresist is repositioned.

FIGS. 6A & 6B through 11A & 11B are schematic diagrams showing a process for fabricating an upper pole layer by a dry etching method adopting a metal mask as the mask for forming an upper pole layer, in which the "A" drawings are side sectional views of the end region of the pole layers and the "B" drawings are front sectional views of the same. A conventional method will be described by referring to FIGS. 6A & 6B through 11A and 11B.

FIGS. 6A and 6B each show a metal layer 5 as an upper magnetic layer formed over the entire surface of a planarization layer that protects a magnetic coil 4 to which a recording current is applied. Reference numeral 1 is a lower pole layer, reference numeral 2 is an insulating layer made of $SiO_2$ or $Al_2O_3$ for providing a magnetic recording gap, and reference numeral 3 is the planarization layer provided above and below magnetic coil 4, as described with respect to FIGS. 1A and 1B above.

As shown in FIGS. 7A and 7B, a metal mask layer 7 is formed over the entire surface of a metal layer 5.

As shown in FIGS. 8A and 8B, a photoresist layer 6 of a predetermined height is formed on metal mask layer 7. The photoresist layer 6 is formed by a typical photolithographic process, including material coating, exposing and developing stages.

As shown in FIGS. 9A and 9B, the portion of the metal mask layer 7 which is not covered by the photoresist layer 6 are etched away.

As shown in FIGS. 10A and 10B, the photoresist layer 6 is removed, and the portions of the layer deposited below the metal mask layer 7 but not covered by the metal mask layer 7 is etched down to the insulating layer 2.

As shown in FIGS. 11A and 11B, the metal mask layer 7 is removed, and the desired magnetic thin-film head is finally obtained.

The above conventional dry etching method, however, has certain drawbacks and disadvantages. It has been determined by experiment that, if the angle of incidence of ion beams is about 15°, the upper pole layer has a trapezoidal cross-section, as shown in FIG. 12A. If the angle of incidence of ion beams is about 45°, unetched portion 5a is produced in the lower portion of upper pole layer 5, as shown in FIG. 12B. If the angle of incidence of ion beams is about 85°, the upper pole layer 5" has a largely rectangular cross-section, and unetched portion 5a" becomes smaller, as shown in FIG. 12C. However, in this case, new problems are involved in that both upper edges 5b of upper pole layer 5" are eroded away, and detached particles 5c are again positioned on the surface of upper pole layer 5".

Moreover, in the conventional dry etching method, in order to form a metal mask layer, a material having a high selectivity to the upper pole layer should be used. However, this imposes an undesirable restriction relative to the selection of materials to form the metal mask layer. Since the etching state of the upper pole layer is extremely sensitive to factors such as deposition conditions, surface oxidation states and shape variations of the metal mask layers, it becomes very difficult to determine processing conditions and parameters for conventional dry etching methods.

SUMMARY OF THE INVENTION

The present invention is directed to a method of making a magnetic thin film head wherein the yield of the magnetic thin film is improved while the shortcomings and disadvantages of the prior art are avoided. More specifically, the present invention is directed to a method of fabricating a magnetic thin-film head, wherein the total yield of the magnetic thin-film head is increased by reducing the width deviation between the upper and lower surface of a pole layer.

Accordingly, an object of the present invention is to provide a method of making a magnetic thin-film head, wherein the yield is increased by reducing the width differential between the upper and lower surfaces of a pole layer.

It is another object of the present invention to provide a method of fabricating a magnetic thin-film head that can facilitate the removal of a photoresist pattern used as a mask.

It is still another object of the present invention to provide a method of fabricating a magnetic thin-film head that can facilitate mask formation.

To accomplish the above objects, a method for fabricating a magnetic thin-film head according to the present invention, comprises the steps of forming an upper pole layer on an unetched magnet-forming layer formed on a lower pole layer, forming a seed layer on said upper pole layer, forming an insulating layer having an aperture pattern corresponding to a desired pattern of the upper pole layer on the seed layer to create an exposed surface on the seed layer that is not covered by the insulating layer, forming a metallic mask layer on the exposed surface of the seed layer, removing the insulating layer; and etching portions of the magnet-forming layer that are not under the metallic mask layer down to a predetermined depth.

Another embodiment of the present invention for fabricating a magnetic thin-film head according to the present invention, comprises the steps of forming an insulating layer on a lower pole layer to provide a magnetic gap, forming a magnet-forming layer containing a magnetic coil on the insulating layer, forming an upper pole layer on the magnet-forming layer, forming a metallic seed layer on the upper pole layer, forming a photoresist layer having an aperture pattern corresponding to a desired pattern of the upper pole layer on the seed layer to create an exposed plane on the seed layer that is not covered by the photoresist layer, forming a metal mask layer on the exposed plane of the seed layer which is not covered by the photoresist layer, removing the photoresist layer, etching the upper pole layer that is not covered by the metal mask layer, thereby forming the upper pole layer into a desired shape beneath the metal mask layer; and removing the seed layer and the metal mask layer.

The accompanying drawings, which are incorporated in and constitute a part of this specification, illustrate an embodiment of the present invention and, together with the description, serve to explain the features of the present invention.

BRIEF DESCRIPTION OF THE DRAWINGS

FIGS. 1A & 1B through 4A & 4B show a fabrication process of an upper pole layer by a conventional dry etching method adopting a photoresist as a mask;

FIGS. 6A & 6B through 11A & 11B show a fabrication process of an upper pole layer by a conventional dry etching method when a metal mask is used as a mask;

FIGS. 13A & 13B through 18A & 18B show a step-by-step fabrication process of a magnetic thin-film head according to the present invention.

DETAILED DESCRIPTION OF THE INVENTION

In the present invention, a non-magnetic insulating layer made of $Al_2O_3$ or $SiO_2$ is first formed on a lower pole layer made of a NiFe-series or FeN-series material for providing a gap to provide a leakage magnetic field required for a magnetic recording, and upper and lower planarization layers, wherein recording current applying coils are buried, are formed thereon. In forming the planarization layer, a lower planarization layer is first formed of synthetic resin. Coils made of copper or the like are then disposed on the lower planarization layer. An upper planarization layer is then formed of synthetic resin over the coils so that the coils are buried in the planarization layer. The upper pole layer is formed of a NiFe-series or FeN-series material on the planarization layer by a deposition method.

According to features of the present invention, a plated seed layer made of a material such as chrome is formed on the upper pole layer to a thickness of 100 Å to 2,000 Å using a general deposition method. According to further features of the present invention, a photoresist layer having an aperture for plating is formed on the plated seed layer. Subsequently, a metal mask layer is formed of a metal such as chrome or copper of a predetermined thickness on the seed layer through the aperture by a plating method. After forming the metal mask layer, the photoresist layer is removed with a solvent such as acetone, and the magnet-forming layer is etched by a conventional method, thereby obtaining a desired magnetic head. The remaining metal mask layer is preferably removed by a wet etching method. At this time, a cyan-Fe-series etchant, for example, is used as the solvent.

FIGS. 13A & 13B through 18A & 18B show a fabrication process of a magnetic thin-film head according to the present invention, in which the "A" drawings are side sectional views of a pole-tip region at each stage, and the "B" drawings are front views thereof.

Figure 1A:
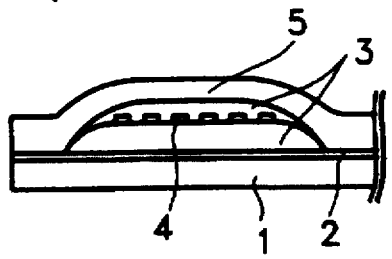
Figure 1B:
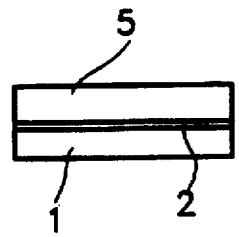
Figure 2A:
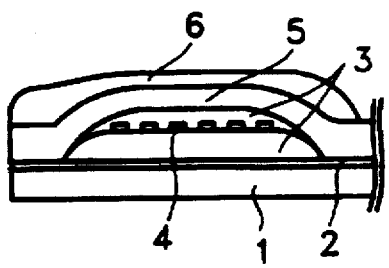
Figure 2B:
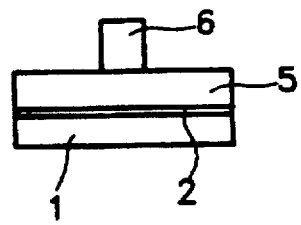
Figure 3A:
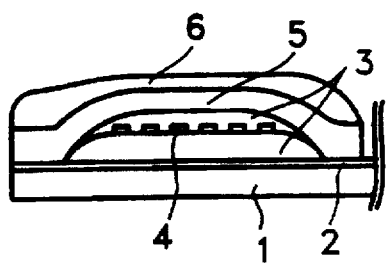
Figure 3B:
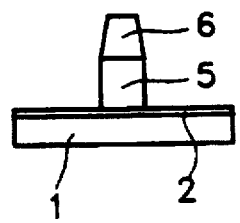
Figure 4A:
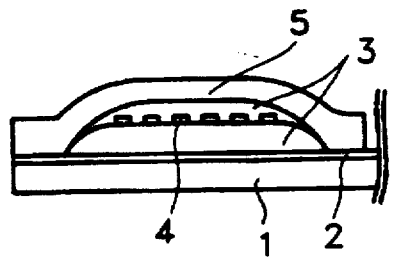
Figure 4B:
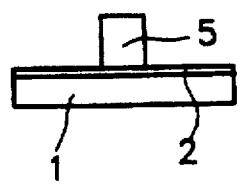
Figure 5A:
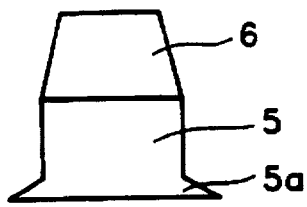
FIGS. 5A and 5B show a conventional etching state of an upper pole layer when a photoresist is used as a mask.
Figure 5B:
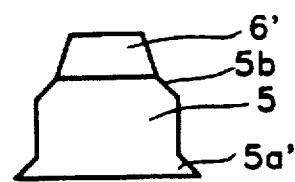
Figure 6A:
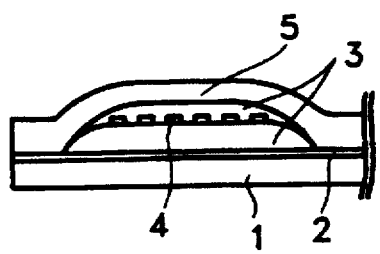
Figure 6B:
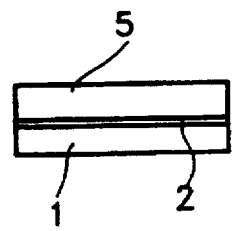
Figure 7A:
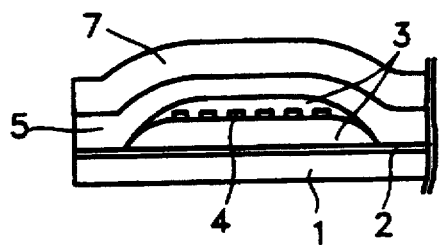
Figure 7B:
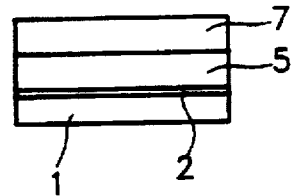
Figure 8A:
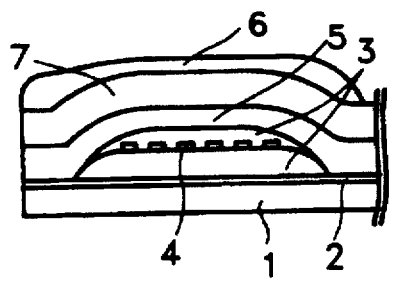
Figure 8B:
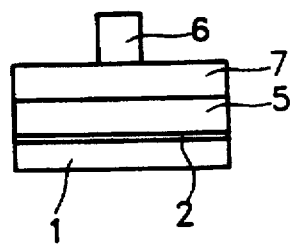
Figure 9A:
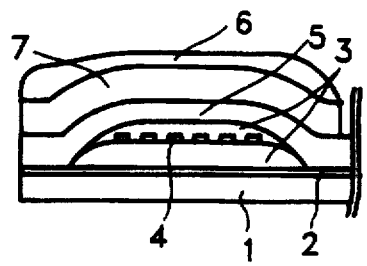
Figure 9B:
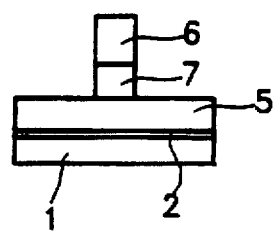
Figure 10A:
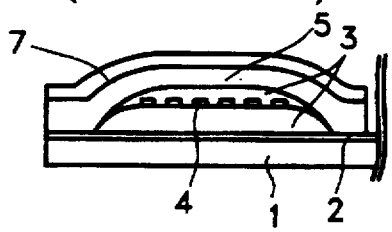
Figure 10B:
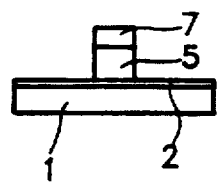
Figure 11A:
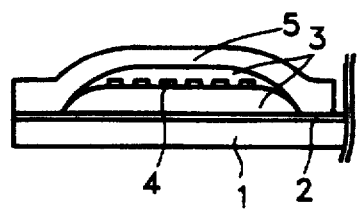
Figure 11B:
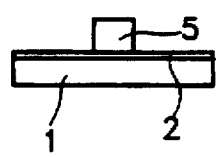
Figure 12A:
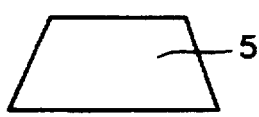
FIGS. 12A–12C show various fabrication states of the upper pole layer, depending on the change of conventional etching directions.
Figure 12B:
Figure 12C:
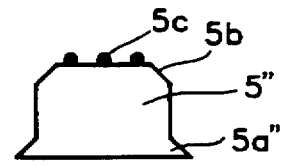
Figure 13A:
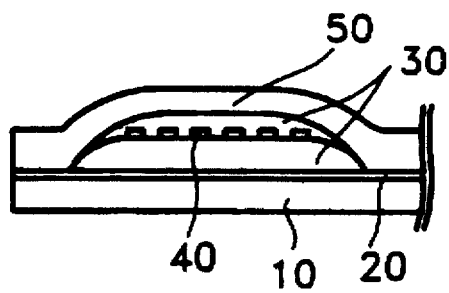
Figure 13B:
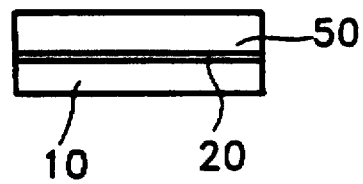

As shown in FIGS. 13A and 13B, a magnet-forming layer is first formed. The magnet-forming layer comprises an insulating layer 20, a lower planarization layer 30, a magnetic coil layer 40, and an upper planarization layer 30 sequentially deposited on a lower pole layer 10. An upper pole layer 50 is formed on the magnet-forming layer by a deposition method.

Figure 14A:
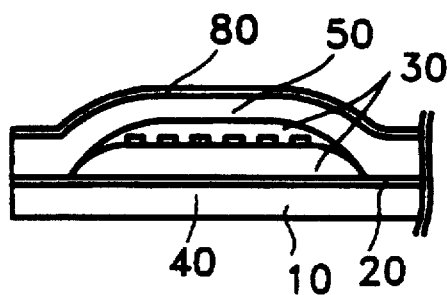
Figure 14B:
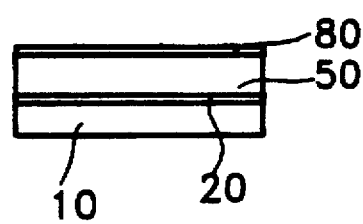

As shown in FIGS. 14A and 14B, a seed layer 80 is formed on the upper pole layer 50 by a deposition method for a subsequent plating process.

Figure 15A:
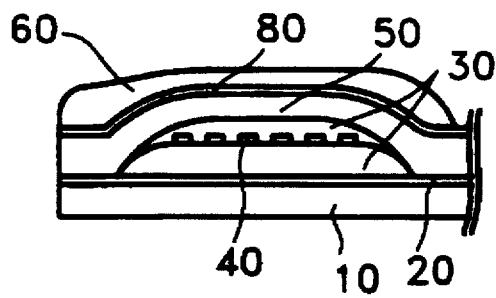
Figure 15B:
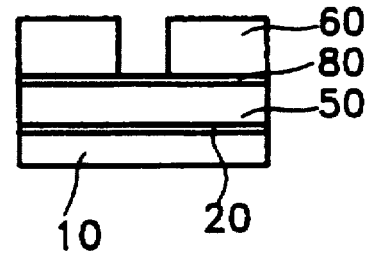

As shown in FIGS. 15A and 15B, a photoresist layer 60 having an aperture corresponding to a desired pattern of the upper pole layer 50 is formed on the seed layer 80. At this time, the photoresist layer 60 is formed only on the non-plated region during the subsequent plating process. To this end, the photoresist layer 60 is wholly coated on the seed layer 80 and then a photolithographic process, including exposing and developing steps, is performed.

Figure 16A:
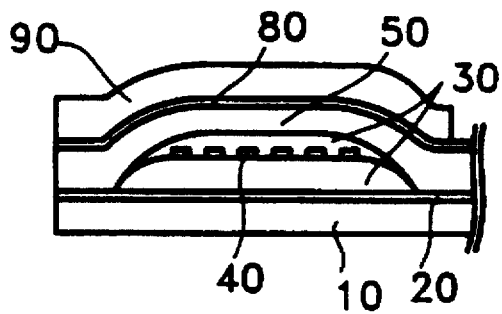
Figure 16B:
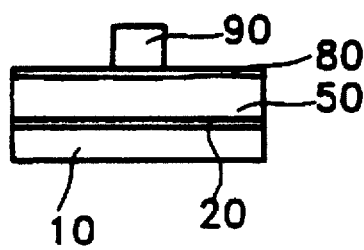

As shown in FIGS. 16A and 16B, a metal mask layer 90 is formed by a plating method on the exposed plane of the seed layer 80 on which the photoresist layer 60 is not formed to a predetermined thickness. Thereafter, the photoresist layer 60 on both sides of the metal mask layer 90 is removed.

Figure 17A:
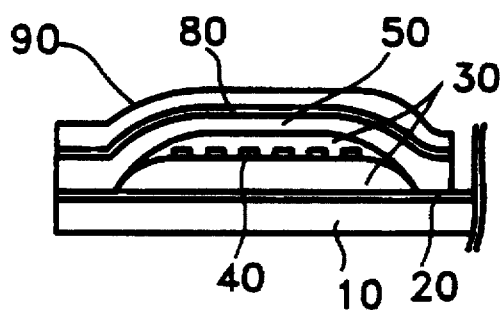
Figure 17B:
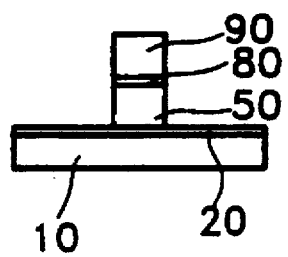

As shown in FIGS. 17A and 17B, the portions or layers that are not covered by the metal mask layer 90 are etched away by an ion beam etching method, e.g., RIE.

Figure 18A:
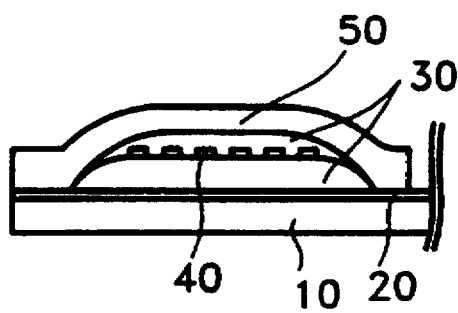
Figure 18B:
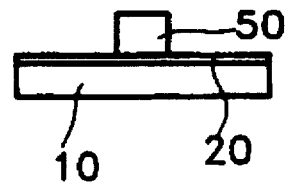

As shown in FIGS. 18A and 18B, the metal mask layer 90 is removed, thereby obtaining a desired magnetic head.

As described above, one of the features of the present invention is to form a metal mask by a plating method in forming an upper pole layer. For this purpose, a seed layer or a base layer for plating is formed by a general deposition method. Thereafter, an aperture corresponding to the shape of the metal mask is placed on the photoresist layer to obtain a metal mask of a desired pattern.

According to the present invention, since the pattern of the metal mask layer can be changed easily and precisely by the shape of the photoresist layer, the size deviation of the processed products due to processing error for each product is reduced, thereby maximizing the reproducibility of the upper pole layer. Consequently, the deterioration rate of the completed magnetic thin-film head is minimized, and the performance differences between the products are reduced.

Also, since the shadow effect caused by a mask having a considerable thickness like a photoresist is reduced by utilizing a metal mask, the width difference between lower and upper portions of an upper pole layer can be reduced.

Since the metal mask is formed by a plating method, there is much less of a limitation in the selection of materials for the metal mask. The greater material option allows a material having a higher selectivity to be selected, thereby optimizing the etching state. Moreover, since the metal mask is formed using a high-level photoresist layer forming method, the width of a minute pole layer can be adjusted to the desired width.

It will be apparent to those skilled in the art that various modifications and variations can be made in the method of the present invention without departing from the scope or spirit of the invention. Other embodiments of the invention will be apparent to those skilled in the art from consideration of the specification and practice of the invention disclosed herein. It is intended that the specification and examples be considered as exemplary only, with true scope and spirit of the invention being indicated by the following claims.

What is claimed is:

1. A method of fabricating a magnetic thin-film head, comprising the steps of:

forming an upper pole layer on an unetched magnet-forming layer formed on a lower pole layer;

forming a seed layer on the upper pole layer;

forming an insulating layer having an aperture pattern corresponding to a desired pattern of the upper pole layer on the seed layer to create an exposed surface on the seed layer that is not covered by the insulating layer;

forming a metallic mask layer on the exposed surface of the seed layer;

removing the insulating layer; and etching at a depth portions of the magnet-forming layer that are not under the metallic mask layer.

2. A method of fabricating a magnetic thin-film head according to claim 1, wherein the insulating layer is formed from a material selected from the group consisting of $Al_2O_3$ and $SiO_2$.

3. A method of fabricating a magnetic thin-film head according to claim 1, wherein the lower pole layer is formed from a material selected from the group consisting of NiFe-series and FeN-series materials.

4. A method of fabricating a magnetic thin-film head according to claim 1, wherein the upper pole layer is formed from a material selected from the group consisting of NiFe-series and FeN-series materials.

5. A method of fabricating a magnetic thin-film head according to claim 1, wherein the seed layer is formed to a thickness between approximately 100 Å to 2,000 Å.

6. A method of fabricating a magnetic thin-film head according to claim 1, wherein the metal mask layer is formed from a material selected from the group consisting of chromium and copper.

7. A method of fabricating a magnetic thin-film head, comprising the steps of:

forming an insulating layer on a lower pole layer to provide a magnetic gap;

forming a magnet-forming layer containing a magnetic coil on the insulating layer;

forming an upper pole layer on the magnet-forming layer;

forming a metallic seed layer on the upper pole layer;

forming a photoresist layer having an aperture pattern corresponding to a desired pattern of the upper pole layer on the seed layer to create an exposed plane on the seed layer that is not covered by the photoresist layer;

forming a metal mask layer on the exposed plane of the seed layer which is not covered by the photoresist layer;

removing the photoresist layer;

etching the upper pole layer that is not covered by the metal mask layer, thereby forming the upper pole layer into a desired shape beneath the metal mask layer; and removing the seed layer and the metal mask layer.

8. A method of fabricating a magnetic thin-film head according to claim 7, wherein the insulating layer is formed from a material selected from the group consisting of $Al_2O_3$ and $SiO_2$.

9. A method of fabricating a magnetic thin-film head according to claim 7, wherein the lower pole layer is formed from a material selected from the group consisting of NiFe-series and FeN-series materials.

10. A method of fabricating a magnetic thin-film head according to claim 7, wherein the upper pole layer is formed from a material selected from the group consisting of NiFe-series and FeN-series materials.

11. A method of fabricating a magnetic thin-film head according to claim 7, wherein the seed layer is formed to a thickness between approximately 100 Å to 2,000 Å.

12. A method of fabricating a magnetic thin-film head according to claim 7, wherein the metal mask layer is formed from a material selected from the group consisting of chromium and copper.

* * * * *